United States Patent [19]

Sano et al.

[11] Patent Number: 5,335,707
[45] Date of Patent: Aug. 9, 1994

[54] HIGH SPEED HEAVY DUTY CROSS PLY TIRE

[75] Inventors: Haruyuki Sano, Osaka; Takao Otani, Kakogawa; Masayoshi Nishitani, Kobe; Mikio Takatsu, Takarazuka; Kiyoshi Ueyoko, Osaka; Toshiaki Yamamoto; Shinichi Miyazaki, both of Kobe, all of Japan

[73] Assignee: Sumitomo Rubber Industries, Ltd., Kobe, Japan

[21] Appl. No.: 834,342

[22] Filed: Feb. 12, 1992

[30] Foreign Application Priority Data

Feb. 15, 1991 [JP] Japan ................. 3-044364

[51] Int. Cl.$^5$ ............ B60C 9/06; B60C 15/05; B60C 15/06
[52] U.S. Cl. .................. 152/543; 152/545; 152/547; 152/549; 152/552; 152/553; 152/556; 152/559; 156/910
[58] Field of Search ........... 152/556, 559, 553, 557, 152/549, 552, 542, 543, 546, 547, 545; 156/910

[56] References Cited

U.S. PATENT DOCUMENTS

| | | | |
|---|---|---|---|
| 3,392,773 | 7/1968 | Warren et al. | 152/543 X |
| 3,902,542 | 9/1975 | Imamura et al. | 152/556 X |
| 3,913,652 | 10/1975 | Imamura et al. | 152/556 X |
| 4,029,137 | 6/1977 | Suydam | 152/559 X |
| 4,046,183 | 9/1977 | Takahashi et al. | 152/543 X |
| 4,209,050 | 6/1980 | Yoshida et al. | 152/556 X |
| 4,215,737 | 8/1980 | Motomura et al. | 152/543 X |
| 4,263,957 | 4/1981 | Abe | 152/559 X |
| 4,296,790 | 10/1981 | Sakai et al. | 152/556 X |
| 4,340,105 | 7/1982 | Abe | 152/556 X |
| 4,349,062 | 9/1982 | Tsurunaga et al. | 152/556 |
| 4,387,759 | 6/1983 | Obata et al. | 152/543 X |
| 4,442,880 | 4/1984 | Takahashi | 152/559 |
| 4,657,058 | 4/1987 | Kabe et al. | 152/556 |
| 4,779,660 | 10/1988 | Tsurunaga | 152/549 X |
| 4,832,102 | 5/1989 | Domchick | 152/556 X |
| 5,131,447 | 7/1992 | Nakagawa et al. | 152/543 |
| 5,196,077 | 3/1993 | Kaga | 152/543 X |

FOREIGN PATENT DOCUMENTS

| | | | |
|---|---|---|---|
| 57-191102 | 11/1982 | Japan | 152/556 |
| 60-35610 | 2/1985 | Japan | 152/543 |
| 60-35611 | 2/1985 | Japan | 152/542 |
| 61-122010 | 6/1986 | Japan | 152/542 |

Primary Examiner—Michael W. Ball
Assistant Examiner—Adrienne C. Johnstone

[57] ABSTRACT

A heavy duty high speed cross ply tire has a carcass composed of at least one aromatic polyamide fiber cord ply, the product $T\sqrt{D}$ of the cable twist number T (turns/10 cm) of the belt cord and the square root of the total denier number D (deniers) of the cord is $2.466 \times 10^3$ to $3.036 \times 10^3$ and the elongation E (%) at breakage of the belt cord divided by the total denier number D is $7.78 \times 10^{-4}$ to $12.22 \times 10^{-4}$.

5 Claims, 7 Drawing Sheets

HIGH SPEED HEAVY DUTY CROSS PLY TIRE

The present invention relates to a high speed heavy duty cross ply tire, suitable for aircraft, which can be produced in light weight without affecting the caress durability.

BACKGROUND OF THE INVENTION

As for the high speed heavy duty cross ply tire, such as an aircraft tire, since the size and flight speed of aircraft have been increased recently, the operating speed of and the acting load on the tires have increased. Therefore, a tire is required to effectively lower the shock when an aircraft takes off or lands, and to have a resistance to a succession of large deformations, as large as 28 to 38%, for example, in the landing state.

As such tire for aircraft, tires having a cross ply structure, that is cross ply tire or bias tire, are widely used, where carcass cords are disposed to mutually cross between plies, since the tire having such structure has an advantage of having a high horizontal rigidity owing to the crossing of carcass cords.

And the ordinary bias tire for aircraft employs the nylon cord which is extendable in order to increase the bead durability as a carcass cord, to decrease the compressive stress F shown in FIG. 7, owing to the elongation accompanying the inflation of the tire. The compressive stress F is acts at the ends of turn up portion a1 of the carcass a around bead core b. And the repeated compressive stress is liable to cause the breakage of the carcass cord and premature rubber separation.

However, nylon cords are inferior in tensile strength, which results in the number of the carcass plies increasing such as at least 10 plies, ordinary more than 16 plies. As a result, the tire weight is inevitably increased, and fuel comsumption performance are decreased.

The present inventors discovered that the tire weight can be reduced by using newly structured aromatic polyamide fiber cords for the carcass, such cords having a very large tensile strength and a very high modulus like a steel cord, but the specific gravity is as light as nylon. The newly developed fiber cords have a limitation of the twist coefficient TN within a specified range.

The prior aromatic polyamide fiber cords are broken relatively easily when folded (when the tire is deformed largely), and the adhesion to rubber is inferior owing to its high degree of crystallization.

SUMMARY OF THE INVENTION

It is therefore, an object of the present invention to provide a heavy duty high speed bias tire, in which the tire weight is reduced by decreasing the number of the carcass plies, while having the bead durability and not affecting the tire strength.

According to one aspect of the present invention, a high speed heavy duty cross ply tire comprises:

- a carcass, turned up around bead cores disposed in each bead portion of the tire, and composed of plural plies of cords laid at angles of no less than 30 degrees and no more than 60 degrees with respect to the tire equator, and
- the carcass plies are composed of at least one aromatic polyamide fiber cord ply,
- the twist coefficient TN of the cord being not less than $2.466 \times 10^3$ and not more than $3.036 \times 10^3$, wherein the twist coefficient TN is the product $T\sqrt{D}$ of the cord twist number T (turns/10 cm) of the cord and the square root of the total denier number D (deniers) of the cord.

BRIEF DESCRIPTION OF THE DRAWINGS

An embodiment of the present invention will now be described in detail in conjunction with the accompanying drawings, in which:

FIG. 3($b$) is a cross sectional view of a rubber strip for the edge cover.

DETAILED DESCRIPTION OF THE INVENTION

Figure 1:
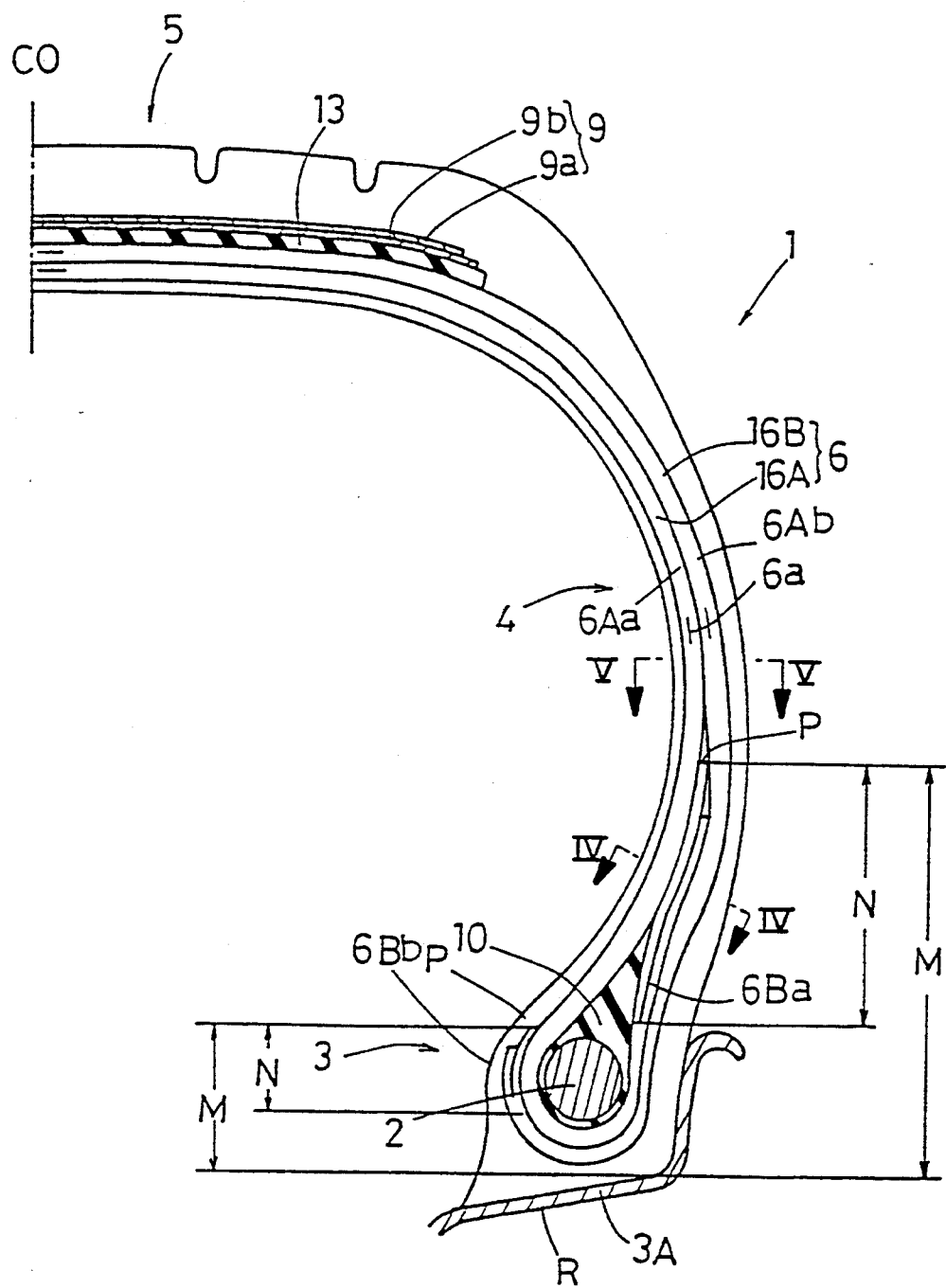
FIG. 1 is a cross sectional view of a tire according to the present invention.
Figure 2:
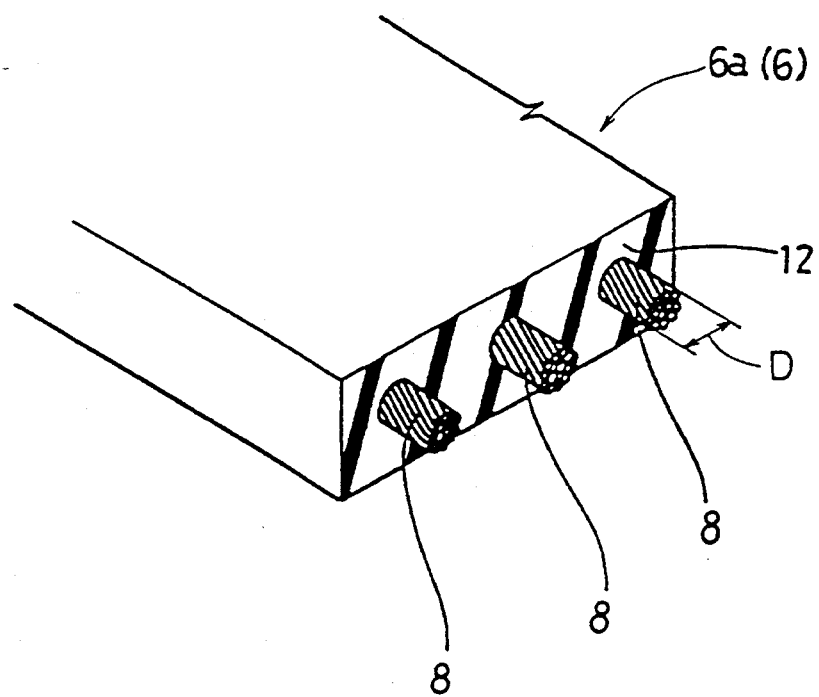
FIG. 2 is an enlarged perspective view of a carcass cord thereof.

Referring now to the drawings, one of the embodiments of the invention is described in detail taking a tire for an aircraft as an example.

The tire 1 is mounted on its regular rim R and inflated to its regular inner pressure, but not loaded.

The tire 1 has a tread portion 5, a pair of axially spaced bead portions 3, and a pair of sidewall portions 4 extending between the tread edges and the bead portions 3. Further, and further the tire 1 comprises a pair of bead cores 2 disposed one in each of the bead portions 3, a carcass 6 extending between the bead portions 3, and a belt 9 disposed radially outside the carcass 6 and inside a rubber tread.

In this embodiment, the carcass 6 is composed of an inner carcass ply group 16A and an outer carcass ply group 16B, each having at least 2 carcass plies 6$a$, 6$a$. In the embodiment, the inner carcass ply group 16A is composed of two plies 6$a$ of parallel cords, which plies are turned up around the bead cores 2 from the axially inside to the outside thereof.

The outer carcass ply group 16B is also composed of two plies of parallel cords, which plies are turned up around the bead core 2 from the outside to the inside thereof in such a manner that the outer carcass encloses the turnup portion of the inner carcass 16A.

However, in the invention, the number of plies of the inner carcass ply group 16A is the same as or more than that of the outer carcass ply group 16B. Further, the number of plies of each group is set to be not more than 4 plies.

The inner carcass ply group 16A has a toroidal main portion 6A$a$ extending between the bead portions and a turnup portions 6B$a$ which axially extend and terminate at terminal ends.

The outer carcass ply group 16B has a toroidal main portion 6A$b$ and turnup portions 6B$a$ which terminate at terminal ends.

Each of the carcass plies 6$a$ is made of cords 8 arranged radially at an angle of from 30 to 60 degrees, preferably 35 to 45 degree, with respect to the tire equator Co. The carcass cords 8 cross the other cords of the adjacent carcass ply, the cords being coated by topping rubber 12.

The plies of the turnup portion 6Ba of the inner carcass ply group 16A are different in height and are increased in height succeedingly toward the inside. The plies of the group 16B are decreased in height toward the inside. Owing to the difference in terminal height, the stress concentrations due to tire deformation at the terminal ends of the plies are reduced. Further, each bead portion 3 is provided between the main portion and each turnup portion of the inner carcass ply group 16A with a bead apex 10 extending radially outwardly from the bead core 2 so as to reinforce the bead portion.

In the invention, in order to decrease the number of carcass plies, the carcass cords 8 of the carcass 6, are composed of twisted aromatic polyamide plural fiber strands, wherein the twist coefficient TN of the cord is not less than $2.466 \times 10^3$ and not more than $3.036 \times 10^3$. Thereby, the elongation of the cords is increased more than ordinary aromatic polyamide cords the cords are prevented from compressive breakage.

Here, the twist coefficient TN is defined as the product $T\sqrt{D}$ of the cable twist number T (turns/10 cm) multiplied by the square root of the total denier number D (deniers) of the cord.

In the case that the twist coefficient is less than $2.466 \times 10^3$, the elongation of the cord is small, and performance in preventing compressive breakage is deteriorated.

In the case that the coefficient is more than $3.036 \times 10^3$, the elongation of the cord becomes large to thereby lowering the tire rigidity, which results in deterioration of tire running performance as well as productivity.

Further, in this embodiment, an elongation factor E/D (E (%) is of the elongation of the cord when broken by increasing the cord load and D is the above-mentioned total denier number D), is preferably not less than $7.78 \times 10^{-4}$ and not more than $12.22 \times 10^{-4}$.

If the elongation factor E/D is less than $7.78 \times 10^{-4}$, the stretch of the carcass when the tire is inflated is small, which results in a decrease in the ability to mitigate compressive stress which acts at the terminal ends of the carcass, when the tire is deformed.

On the other hand, if E/D is more than $12.22 \times 10^{-4}$, the stretch of the carcass becomes unpreferably large. The carcass cords are topped by topping rubber 12, as aforesaid, to form the carcass ply 6a. The topping rubber 12 has to possess not only a low heat-generating characteristic but also an appropriate stiffness not to disturb the above-mentioned characteristics of the cord.

For this purpose, a rubber composition having such elastic characteristics that the 100% modulus is 30 to 70 kgf/cm$^2$ and the elongation at rupture is not less than 200% and not more than 500%, is preferably used.

Further, the base material of the rubber composition is composed of one or more materials selected from natural rubber and synthetic isoprene rubber.

Furthermore, the content of carbon black in the rubber composition is 50 to 70 parts by weight.

When the carbon content is less than 50 parts by weight, the composition can not be reinforced. When the content exceeds 70 parts by weight, the heat generation has a tendency to increases.

Further, when the 100% modulus is less than 30 kgf/cm$^2$, the heat-generation has a strong tendency to increase. On the other hand, when it exceeds 70 kgf/cm$^2$, the strength has a tendency to decrease.

Furthermore, when the elongation at breakage is less than 200%, breakage of the rubber is apt to be caused when deformation of the tire is very large. When it is more than 500%, the heat generation increases.

In general, aromatic polyamide fiber cords have a superior strength and a very low extensibility, but involve a problem that adhesion to the topping rubber is smaller when compared with nylon fiber cords and aliphatic polyamide fiber cords, such problem having restricted their use.

In a heavy duty high speed tire for aircraft or the like, if the adhesion is less than about 21.0 kgf/cm, a rubber separation might occur in a high-speed rotation under a heavy load and a large deformation, and thus, it can not be adopted for a carcass.

Table 1 shows a treating method (so called double dipping) for a nylon or aliphatic polyamide fiber cord, by which the adhesion of the nylon or aliphatic polyamide fiber cord to the topping rubber is effectively improved. But, in the aromatic polyamide fiber cord, this method is ineffective, and an adhesion of more than 21.0 kgf/cm can not be obtained.

However, we found an effective method of treating the aromatic polyamide fiber cord, through which the adhesion to the topping rubber becomes the same level as nylon or aliphatic polyamide fiber cords, or more improved, and thereby it becomes possible to use aromatic polyamide fiber cords for the cord.

Table 2 shows this improved treating method or process, in which the aromatic polyamide fiber cord is treated by a 1st dipping process twice repeated and then a 2nd dipping process twice repeated.

Thereby, adhesion more than 21.0 kgf/cm, which can prevent rubber separation under the large deformation of the aircraft tire, can be obtained. The bead portion 3 can be further provided with a rim chafer (not shown) extending along the bead profile to prevent the side face and bottom face thereof from being chafed by the rim R.

In this embodiment, the cord spacings L1, L2 between the carcass cords 8, 8 of the adjacent carcass plies 6a,6a, at the end regions N and the another regions, are limited in order to prevent ply separation.

The end region N of each of turnup portions 6Ba, 6Bb is defined as the region extending from the terminal end of the highest ply of each turnup portion 6Ba, 6Bb, to the point separated radially inward from such terminal end, the length or distance being 60% of the height M of such highest ply as measured radially from the bead base line.

Figure 3A:
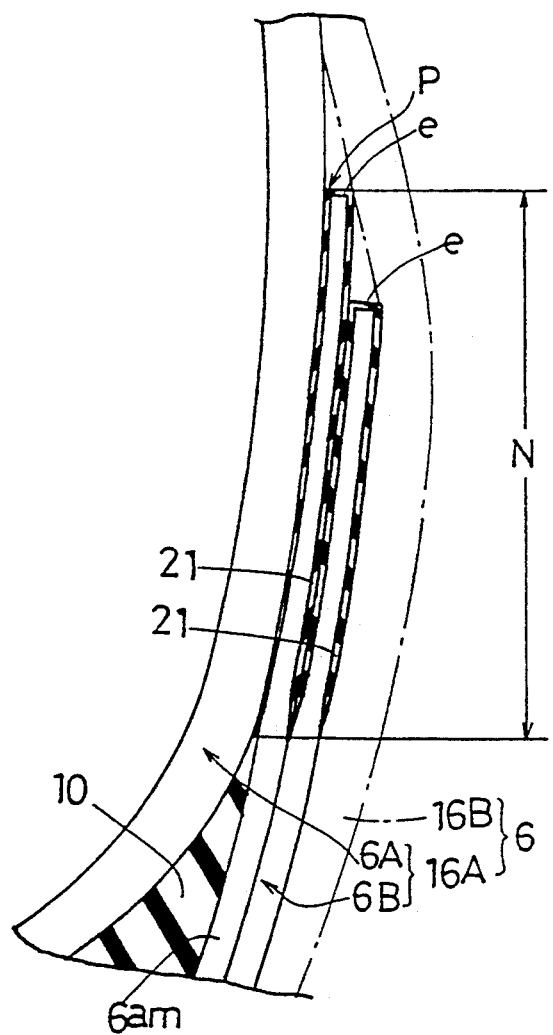
FIG. 3($a$) is an enlarged cross sectional view of a carcass edge thereof.

In the embodiment shown in FIGS. 1 and 3(a), the each ply near the bead core 2 is the highest ply of the respective turn up portion 6Ba, 6Bb. The highest of the terminal ends is designated as P among each end e.

At the end region N, the cord spacings L1 is set in the range of not less than ¼ times and not more than 2.0 times the diameter of carcass cord 8, to mitigate the ply shearing stress by the rubber existing therebetween.

Here, the cord spacing L1 is the space distance between the cords 8 of adjacent carcass plies 6a, 6a.

When the cord spacing L1 is less than ¼ times the cord diameter, the mitigating effects for shear stress and carcass separation are not obtained. When the cord spacing is more than 2 times the cord diameter, heat generation increases and heat failure of the rubber is liable to occur.

In order to provide the cord spacing L1, in the present invention, edge covers 21 are provided at the carcass ply edges.

To effectively mitigate the above-mentioned shear stress, a rubber compound having a 100% modulus of from 40 to 70 kg/sq.cm,
a elongation at rupture of from 200 to 350%,
a stress at rupture of from 150 to 300 kg/sq.cm is used for the edge covers 21.

When the 100% modulus is less than 40 kg/sq.cm, heat generation increases and thermic breakdown is liable to occur. When the 100% modulus is more than 70 kg/sq.cm, the shear mitigating effect becomes insufficient, and the adhesion with the cords becomes poor, resulting in the cord loosening.

When the elongation at rupture is less than 200%, the compliance with the cord elongation becomes difficult and the rubber is liable to be broken.

When it exceeds 350%, heat generation increases.

When the stress at rupture is less than 150 kg/sq.cm, the ply stiffness is lowered. When it exceeds 300 kg/sq.cm, the shear mitigating effect decreases.

Figure 3B:
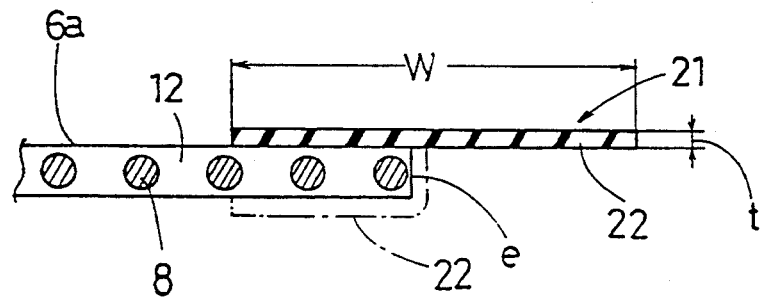
Figure 4:
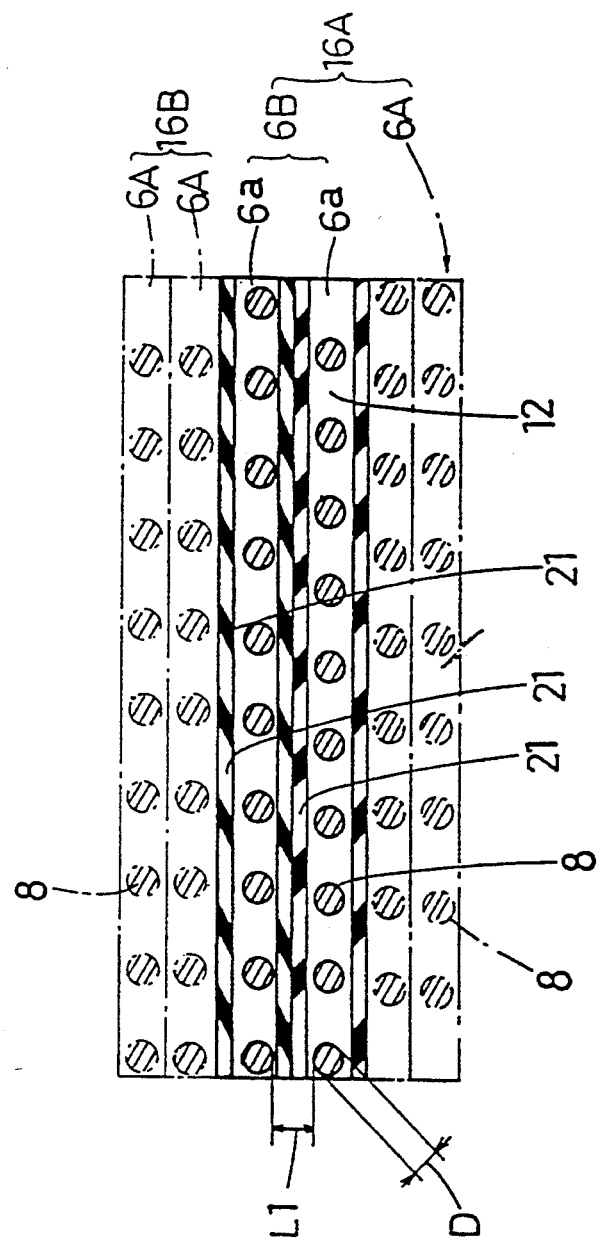
FIG. 4 is a cross sectional view of IV—IV line of FIG. 1.
Figure 5:
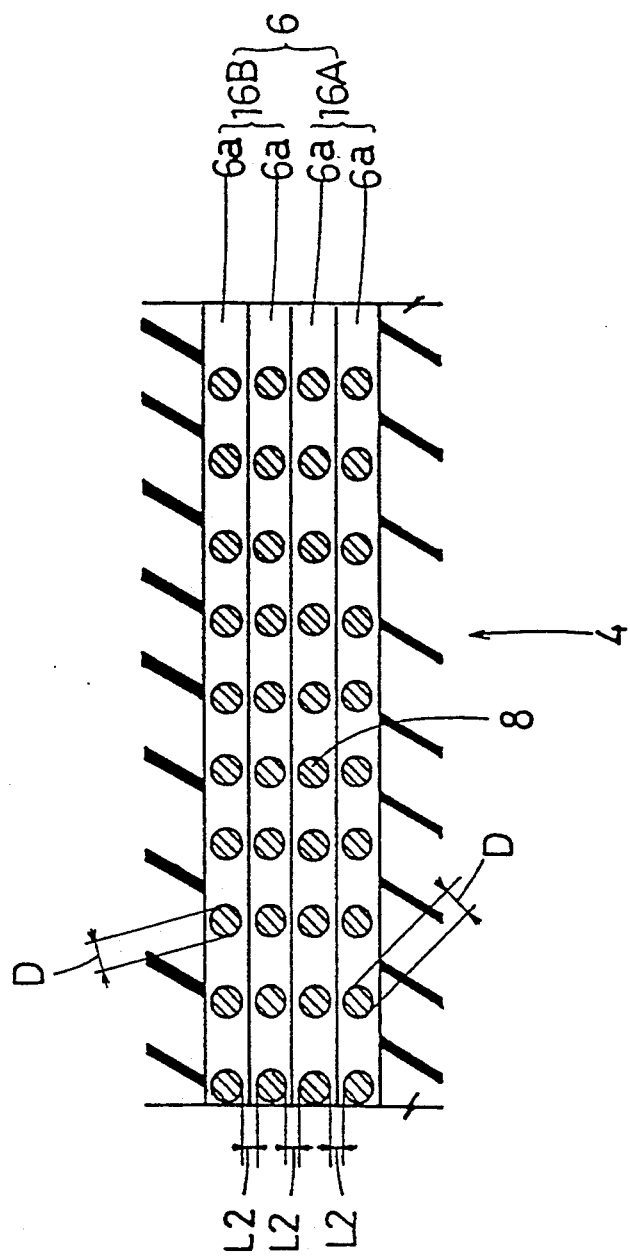
FIG. 5 is a cross sectional view of V—V line of FIG. 1.

The above-mentioned edge covers 21 are formed by a strip 22 of semi-vulcanized or unvulcanized rubber, which is folded to wrap the ply edge therein as letter U, as shown in FIG. 3(b).

The strip 22 has the width enough to wrap the end region N folding at the terminal ends e of the plies 6a. The strip 22 is vulcanized through the vulcanization of the tire using a mold. In the vulcanization, the rubber strip 22 is softened by the heat and pressed, and accordingly it is liable to flow out decreasing its thickness. Therefore, the thickness (t) of the strip 22 is determined such that the cord spacing provided by the strip 22 in an unvulcanized tire state is slightly larger than the final cord spacing.

The thickness (t) of the strip 22 is in the range of from 0.2 mm to 2.0mm.

In the present invention, it is also possible to form the cord spacings L1 without employing the strip 22. In that case, the thickness of the topping rubber 12 is increased at the end region N of the carcass, previously.

Accordingly, the cord spacing at the end region N becomes larger than that at the another region of the carcass plies 6a. Another region is defined as the region of the carcass 6 excepting the end region N, that is, the another region includes the toroidal main portions 6Aa, 6Ab and turnup portions 6Ba, 6Bb excepting the end region N.

At the another regions, the cord spacings L2 are set in the range of 0.1 times to 1.6 times the diameter of carcass cord 8 and is smaller than the cord spacings L1, thereby the thickness of the carcass at the another regions is decreased, not affecting the carcass strength, and weight of the tire can be reduced.

When the cord spacing L2 is less than 0.1 times of the cord diameter, the adhesion strength decreases and cord looseness is apt to occur. When the cord spacing is more than 1.6 times the cord diameter, heat generation increases and heat failure of the rubber is liable to occur. The cord spacing L2 is preferably is the range of 0.3 to 1.0 times the cord diameter.

In the tire, the aforesaid breaker 9 is formed by means of a retread rubber 13 inside the tread part 5 and outside the carcass 6 in the radial direction.

The breaker 9 comprises a wide breaker ply 9a placed on the side of the carcass 6 and a breaker ply 9b placed outside it, and the plies 9a and 9b are formed to have the width in the range of from 100 to 130% of the axial width of the ground contact area of the tread surface.

The breaker 9 applies the hoop effect and the envelope effect to tile tread part. The hoop effect prevents the protrusion of the crown part due to the centrifugal force which accompanies revolving at a very high speed and so-called growth of tire where the protruding shape remains as a permanent change of the shape due to a succession of such protrusion.

Moreover, the breaker 9 functions as a protective layer preventing a damage in the ground contact surface from reaching the carcass 6.

Therefore, same organic fiber cords or the like as the carcass cords can be preferably used as breaker cords, and they are placed at an inclination of 45 deg. or less, preferably 35 deg. or less against the tire's equator as well as crossing between the plies 9a and 9b. The ordinary cord is also available for the breaker 9.

Figure 6:
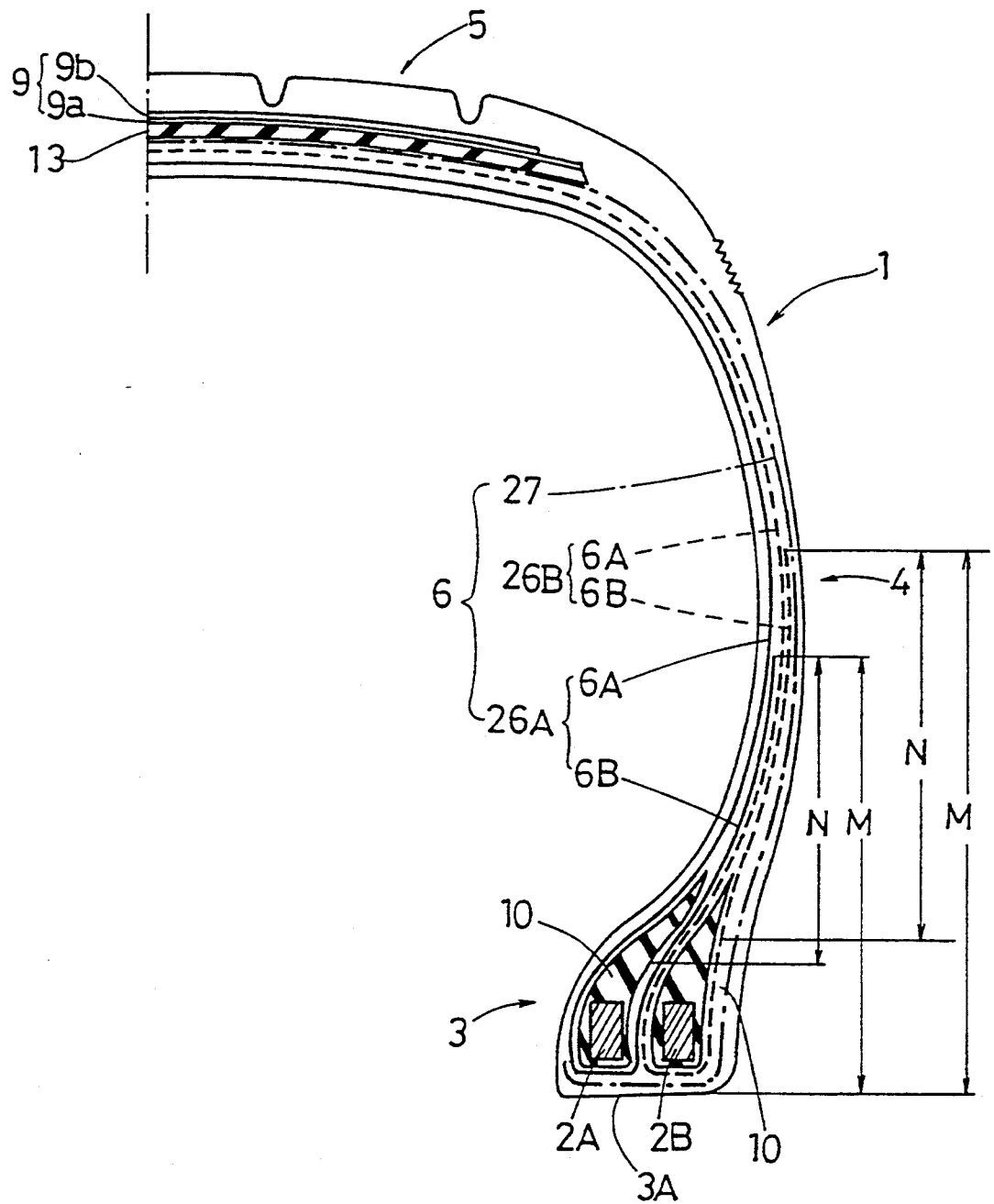
FIG. 6 is a cross sectional view of a tire of another embodiment of the present invention.

The retread rubber 13 is extended through the entire width of the inside of the breaker 9 in the radial direction and is 2.0 mm or more in thickness to prevent a damage of the carcass 6 upon removing the tread rubber. FIG. 6 shows the other embodiment using two bead cores 2 composed of first and second bead cores 2A and 2B placed in the bead portion 3 aligned outward from inside in the direction of the tire's axis.

In the embodiment, the carcass is composed of first inner carcass ply group 26A, second inner carcass ply group 26B, and a supplemental carcass ply group 27. The first carcass ply group 26A comprises plural plies more than that of the second group but not more than 4 plies and the second carcass ply group 26B comprises not more than 4 plies. And the groups 26A, 26B are turned up around the bottom surface of the first and second bead core 2A, 2B from inside to outside of the tire, respectively.

The supplemental carcass ply group 27 comprising not more than 2 plies is folded at the bottoms of both bead cores 2A and 2B from outside to inside of the tire.

At the end regions N of the first and second inner carcass ply groups 26A, 26B, the cord spacings L1 are set in the range of ¼ times to 2.0 times the diameter of carcass cord 8, to mitigate the ply shearing stress by the rubber existing therebetween. At the another regions, the cord spacings L2 are set in the range of 0.1 times to 1.6 times the diameter of carcass cord 8 and is smaller than the cord spacings L1, thereby the thickness of the carcass at the another regions is decreased, not affecting the carcass strength, and weight of the tire can be reduced.

Tires of size 46×17 for aircraft having the tire structure shown in FIGS. 1 and 6 were prepared according to Table 3 and tested for the tire strength and the high speed durability. The specifications and test results are given in Table 3.

The high speed durability test was the 100 cycle overload takeoff test, under a 100% load of the normal tire load, in accordance with Technical Standard Order TSO-C62c of the U.S. Federal Aviation Administration.

After the 100 cycle test, the tire was cut to be inspected for breakage of the carcass rubber, that is, carcass separation.

The tire strength was tested according to an Over Pressure Test. The test tire was filled with water, and the water pressure was increased to cause any tire failure. The results are shown in Table 3.

As described above, in the high speed heavy duty tire according to the present invention, by employing the aromatic polyamid cords specialized by twist coefficient TN for the carcass, a separation failure at the ply edge of the carcass is prevented, decreasing the tire weight and without deteriorating the running performance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

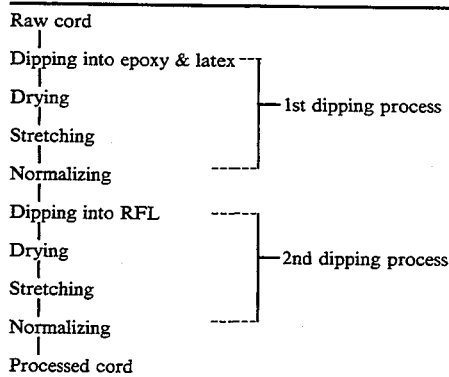

TABLE 2

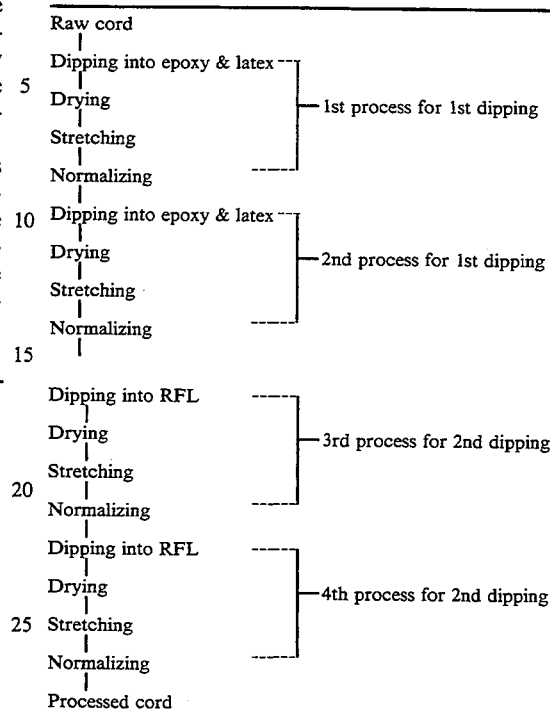

TABLE 3

Figure 7:
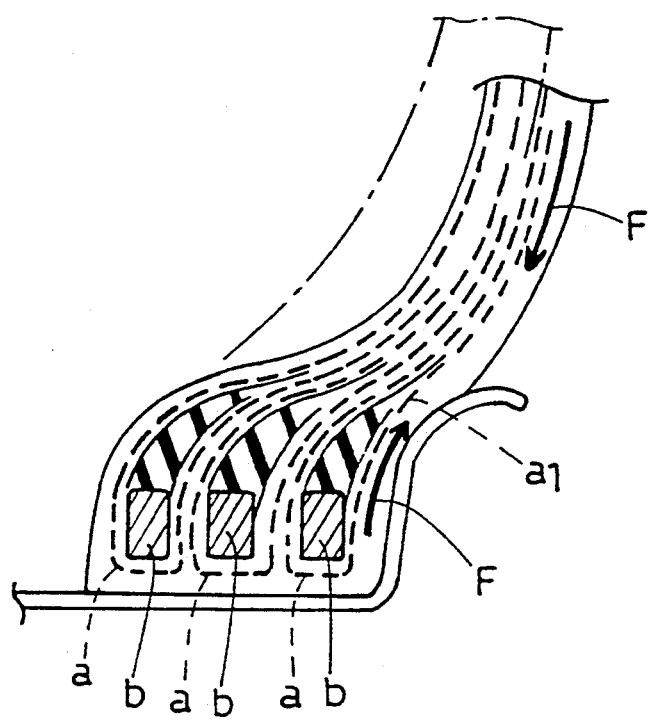
FIG. 7 is a cross sectional view showing the compressive stress of a tire.

|  | Ex. 1 | Ex. 2 | Ex. 3 | Ref. |
| --- | --- | --- | --- | --- |
| Bead structure | single bead | double bead | double bead | triple bead |
| Carcass structure | FIG. 1 | FIG. 6 | FIG. 6 | FIG. 7 |
| Inner carcass ply group | 2 plies | 2 plies | 2 plies | 16 plies |
| Outer carcass ply group | 2 plies | 2 plies | 2 plies | — |
| Cord angle | 34° | 34° | 34° | 34° |
| Cord diameter (mm) | 1.29 | 1.29 | 1.29 | 0.67 |
| Cord ends (number/50 mm) | 33 | 33 | 33 | 57 |
| Dipping process | table 2 | table 2 | table 2 | table 1 |
| Adhegion strength (kg/cm$^2$) | 23.8 | 23.8 | 23.8 | 17.8 |
| Carcass cord |  |  |  |  |
| material | aromatic polyamid | aromatic polyamid | aromatic polyamid | nylon |
| number of turn T | 30 | 30 | 30 | 38.2 |
| denier D | 3000 d/3 | 3000 d/3 | 3000 d/3 | 1260 d/2 |
| twist coefficient TN | $2.846 \times 10^3$ | $2.846 \times 10^3$ | $2.846 \times 10^3$ | $1.918 \times 10^3$ |
| breakage strength (Ks) | 129.0 | 129.0 | 129.0 | 23.4 |
| elongation at breakage (%) | 9.0 | 9.0 | 9.0 | 22.0 |
| elongation factor | $10 \times 10^{-4}$ | $10 \times 10^{-4}$ | $10 \times 10^{-4}$ | $87.30 \times 10^{-4}$ |
| Cord spacing/cord denier (L1/D) | 0.25 | 2.0 | 1.0 | 1.0 |
| Cord spacing/cord denier (L2/D) | 0.1 | 1.6 | 0.8 | 0.8 |
| Carcass separation | non | non | non | non |
| *Over pressure resistance (kg/cm$^2$) | 64 | 65 | 65 | 70 |
| Weight (kg) | 63 | 65 | 63 | 83 |

*standard: 59 kg/cm$^2$ (TSO-C62c)

We claim:

1. A heavy duty high speed cross ply tire comprising at least one pair of bead cores, one of each of said at least one pair of bead cores being disposed in each bead portion of the tire, a carcass composed of a plurality of plies of cords laid at angles of 30 to 60 degrees with respect to the tire equator, each said carcass ply turned up around the bead cores to have turned up portions, said carcass plies including at least one ply of aromatic polyamide fiber cords, the twist coefficient TN of each said aromatic polyamide fiber cord being in a range of $2.466 \times 10^3$ to $3.036 \times 10^3$, wherein the twist coefficient TN is defined as the product $T\sqrt{D}$ of the cord twist number T (turns/10 cm) of the cord and the square root of the total denier number D (deniers) of the cord, each said carcass ply turned up portion provided with a cord spacing between the carcass cords therein and the cords of adjacent carcass plies, the radially outer edge of each said carcass ply turned up portion wrapped by an edge cover in such a way that: in an end region, the cord spacing being in a range of 0.25 to 2.0 times the diameter of the carcass cords, said end region defined as extending between the radially outermost edge of the carcass ply turnup portions and a point being radially inward thereof by a distance of 60% of the radial height of said radially outermost edge as measured from the bead base line; and in the remaining region other than said end region, the cord spacing being smaller than that in said end region and being in a range of 0.1 to 1.6 times said diameter of the carcass cords, said edge cover made of a rubber compound having a 100% modulus of 40 to 70 kgf/sq.cm, an elongation at rupture of 200 to 350%, a stress at rupture of 150 to 300 kgf/sq.cm, and a thickness of 0.2 to 2.0 mm.

2. The cross ply tire according to claim 1 wherein the elongation factor which is defined as the elongation (%) at breakage of the carcass cord divided by the total denier number D of the carcass cord, is in a range from $7.78 \times 10^{-4}$ to $12.22 \times 10^{-4}$.

3. The cross ply tire according to claim 1, wherein said carcass includes an inner carcass ply group turned up at the bead core from inside to outside and an outer carcass ply group turned up at the bead core from outside to inside, each group being composed of at least 2 plies, and the number of the plies of said inner carcass ply group is not less than that of the outer carcass ply group and not more than 4 plies.

4. The cross ply tire according to claim 1, wherein there are two pairs of bead cores, the bead cores in each bead portion being aligned from inside to outside in the tire axial direction, and said carcass comprises a first inner carcass ply group and a second inner carcass ply group disposed radially outside said first group, said first group and said second group being turned up at the axially inner bead core and axially outer bead core from axially inside to outside, respectively, each said group being composed of at least 2 plies, and the number of the plies of said first group is not less than that of said second group and not more than 4 plies.

5. The cross ply tire according to claim 4, wherein said carcass further comprises a supplemental carcass ply group disposed radially outside said second group, said supplemental carcass ply group having not more than 2 plies and turned up from axially outside to inside around both pairs of bead cores.

* * * * *